March 21, 1939.  A. H. LAUDER  2,151,556
SYNCHRONOUS MOTOR CONTROL SYSTEM
Filed Jan. 29, 1937
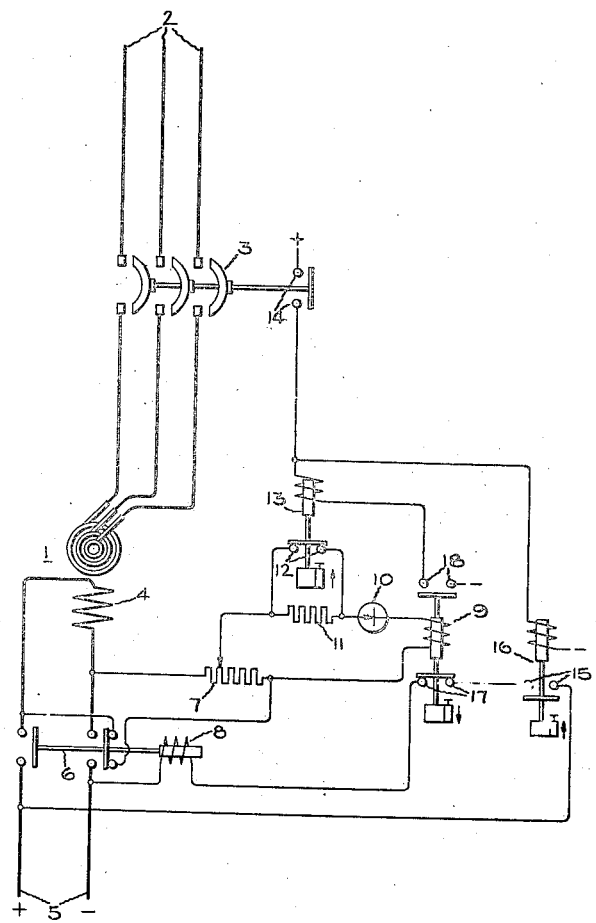
Inventor:
Arthur H. Lauder,
by Harry E. Dunham
His Attorney.

Patented Mar. 21, 1939

2,151,556

UNITED STATES PATENT OFFICE 2,151,556

SYNCHRONOUS MOTOR CONTROL SYSTEM

Arthur H. Lauder, Schenectady, N. Y., assignor to General Electric Company, a corporation of New York Application January 29, 1937, Serial No. 122,935

5 Claims. (Cl. 172—289)

My invention relates to control systems for synchronous motors, and particularly to such a system for controlling the excitation of a synchronous motor in response to the motor reaching a predetermined speed near synchronous speed during the starting operation, and its object is to provide an improved field excitation control system of this type.

Synchronous motors are sometimes used in such a manner that they have their maximum load applied thereto at the instant of starting and for a short time thereafter. For example, in a ball mill the material settles down in such a manner when the mill is stopped that the load on the driving motor is ten to twenty per cent greater at the instant of starting than it is after the mill has been in operation fifteen or twenty seconds. When such a mill is driven by a synchronous motor which has a small margin of pull-in torque, it is necessary, in order to synchronize the motor, that it be allowed to attain its maximum possible speed before field excitation is applied. Also, in such a case, the field excitation should be applied at the most favorable point during the slip cycle. It is the usual practice to adjust the speed-responsive means which controls the application of excitation to a synchronous motor field winding so that the excitation is applied at substantially the maximum speed it can reach as an induction motor. The speed-responsive means cannot be safely set to operate at the maximum speed which the motor will attain as an induction motor because any slight increase in load or a reduction in the voltage applied to the motor armature winding will prevent the motor from ever attaining this maximum speed, in which case the field excitation would never be applied.

In order to take advantage of all of the margin in pull-in torque possessed by the motor and to give the load an opportunity to reduce as much as possible before the motor is synchronized, I provide, in accordance with my invention, an arrangement for recalibrating the speed-responsive means after the motor has been in operation for a predetermined time so that, if for any reason the motor fails to reach within a predetermined time the predetermined speed at which the speed-responsive means is normally set to respond, the speed-responsive means is recalibrated to operate at a lower predetermined speed.

My invention will be better understood from the following description, when taken in connection with the accompanying drawing, the single figure of which diagrammatically illustrates a synchronous motor starting system embodying my invention, and its scope will be pointed out in the appended claims.

Referring to the accompanying drawing, I represents a synchronous motor having an armature winding which is arranged to be connected to a suitable alternating current supply circuit 2 by means of a switch 3 which may be of any suitable type, examples of which are well-known in the art. While I have shown a manually controlled switch, it is obvious that any suitable automatic means may be employed for controlling the opening and closing thereof. The motor I is also provided with a field winding 4, which is arranged to be connected to a suitable source of excitation 5, by means of a field switch 6 that is arranged to be closed when the motor speed increases above a predetermined value. The field switch 6, when open, is arranged to connect a suitable discharge resistor 7 across the terminals of the field winding 4.

In order to close the field switch 6 automatically when the motor speed reaches a predetermined value during the starting operation of the motor, the field switch 6 is provided with a closing coil 8, the circuit of which is controlled by means of a relay 9, the winding of which is connected in series relation with a half-wave rectifier 10 and the field winding 4 when the field switch 6 is open. Preferably the winding of the relay 9 and the rectifier 10 are connected in series across a portion or all of the resistor 7 so that the rectifier 10 only rectifies a portion of the total induced current flowing in the field winding 4. The relay 9 may be of any suitable type, examples of which are well-known in the art, which closes its front contacts substantially instantaneously when the relay winding is energized by a predetermined current and which opens its front contacts a predetermined time after the relay winding is deenergized.

In order to vary the calibration of the speed-responsive relay 9 after the motor has been in operation for a predetermined time, I provide a suitable impedance means, such as a resistor 11, in series with the rectifier 10 and the winding of the relay 9, and have this resistor 11 normally short-circuited by the contacts 12 of a time relay 13. The winding of this time relay 13 is connected in series with the contacts 14 of the switch 3 and contacts 18 of relay 9 so that the relay 13 does not open its contacts 12 until after the motor I has been in operation as an induction motor for a predetermined time.

To prevent the field switch 6 from being closed at the instant the switch 3 is closed to start the motor, the circuit of the closing coil 8 of the field switch 6 also includes the contacts 15 of a time relay 16. The winding of the relay 16 is connected in parallel with the winding of the relay 13 so that the relay 16 closes its contacts 15 and places the closing coil 8 under the control of the speed-responsive relay 13 a predetermined time after the switch 3 is closed. The time setting of the relay 16, however, is relatively short compared with the time setting of the time relay 13.

The operation of the arrangement shown in the drawing is as follows: When the motor 1 is at rest and the switch 3 is closed, a current of line frequency is induced in the field winding 4 and this current flows through the discharge resistor 7. A portion of this current is rectified by the rectifier 10 and flows through the winding of the relay 9 so that it immediately opens its contacts 17. A short time after the switch 3 is closed, the relay 16 closes its contacts 15, but in the meantime, the relay 9 has operated to open its contacts 17 so that the circuit of the closing coil 8 is not completed by the closing of the contacts 15. As the speed of the motor increases after the switch 3 is closed, the frequency of the current induced in the field winding 4 decreases. Therefore, as the speed of the motor increases, the intervals of zero current through the winding of the relay 9 increase in length, but due to the construction of the relay, it does not close its contacts 17 until the motor reaches a predetermined speed near synchronous speed, when the interval of zero current through the winding of the relay 9 is of sufficient duration to allow the relay to close its contacts 17. The closing of the contacts 17 completes a circuit for the closing coil 8 of the field switch 6 across the source of excitation 5. The field switch 6 then closes to connect the field winding 4 across the source of excitation 5, and to disconnect the discharge resistor 7 and the winding of relay 9 from in series relation with field winding 4.

If the load on the motor is of such a value that the motor speed does not increase to a value sufficient to permit the relay 9 to close its contacts 17 within the time setting of the relay 13, this relay, by opening its contacts 12, inserts the resistor 11 in series with the rectifier 10 and winding of the relay 9. The insertion of the resistor 11 in this circuit reduces the current through the winding of the relay 9 sufficiently to cause the relay to close its contacts 17 and thereby complete the circuit of the closing coil 8 of the field switch 6.

In the arrangement shown in the drawing, it will be seen that when the motor starts under heavy loads, the relay 9 will not close its contacts 17 until after the time relay 13 has operated to open its contacts 12. However, on light loads where the synchronizing is easier, the relay will close its contacts 17 before the relay 13 opens its contacts.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, a synchronous motor having an armature winding and a field winding, means for starting said motor including a source of alternating current and switching means for controlling the connection of said source to said armature winding, a source of excitation, means controlled by the speed of said motor normally arranged to effect the connection of said source of excitation to said field winding when the motor speed reaches a predetermined value, and timing means controlled by said starting means for causing said speed controlled means to effect the connection of said source of excitation to said field winding at a motor speed below said first-mentioned predetermined value but above a second predetermined value.

2. In combination, a synchronous motor having an armature winding and a field winding, means for starting said motor including a source of alternating current and switching means for controlling the connection of said source to said armature winding, a source of excitation, means controlled by the current induced in said field winding normally arranged to effect the connection of said source of excitation to said field winding when the motor speed reaches a predetermined value, and timing means controlled by said starting means for causing said induced current controlled means to effect the connection of said source of excitation to said field winding at a motor speed below said first-mentioned predetermined value but above a second predetermined value.

3. In combination, a synchronous motor having an armature winding and a field winding, an alternating current circuit, means for connecting said armature winding to said circuit, a control device, unidirectional conducting means connected in series relation with said field winding, means controlled by the current through said unidirectional conducting means for effecting the operation of said control device, and timing means for decreasing the current flowing through said unidirectional conducting means to effect the operation of said control device a predetermined time after said motor is started.

4. In combination, a synchronous motor having an armature winding and a field winding, an alternating current circuit, means for connecting said armature winding to said circuit, a source of excitation, switching means for connecting said source of excitation to said field winding, unidirectional conducting means connected in series relation with said field winding, means including a time relay having a winding energized in accordance with the current flowing through said unidirectional conducting means for effecting the operation of said switching means, impedance means, and timing means for connecting said impedance means in circuit with said unidirectional conducting means and said field winding to decrease the current through said relay winding a predetermined time after said motor is started.

5. In combination, a synchronous motor having an armature winding and a field winding, an alternating current circuit, means for connecting said armature winding to said circuit, a source of excitation, switching means for connecting said source of excitation to said field winding, unidirectional conducting means connected in series relation with said field winding, means including a time relay having a winding energized in accordance with the current flowing through said unidirectional conducting means for effecting the operation of said switching means, impedance means, and timing means controlled by said connecting means for connecting said impedance means in circuit with said unidirectional conducting means and said field winding to effect a decrease in the current through said relay winding after said armature winding has been energized for a predetermined time.

ARTHUR H. LAUDER.